UNITED STATES PATENT OFFICE.

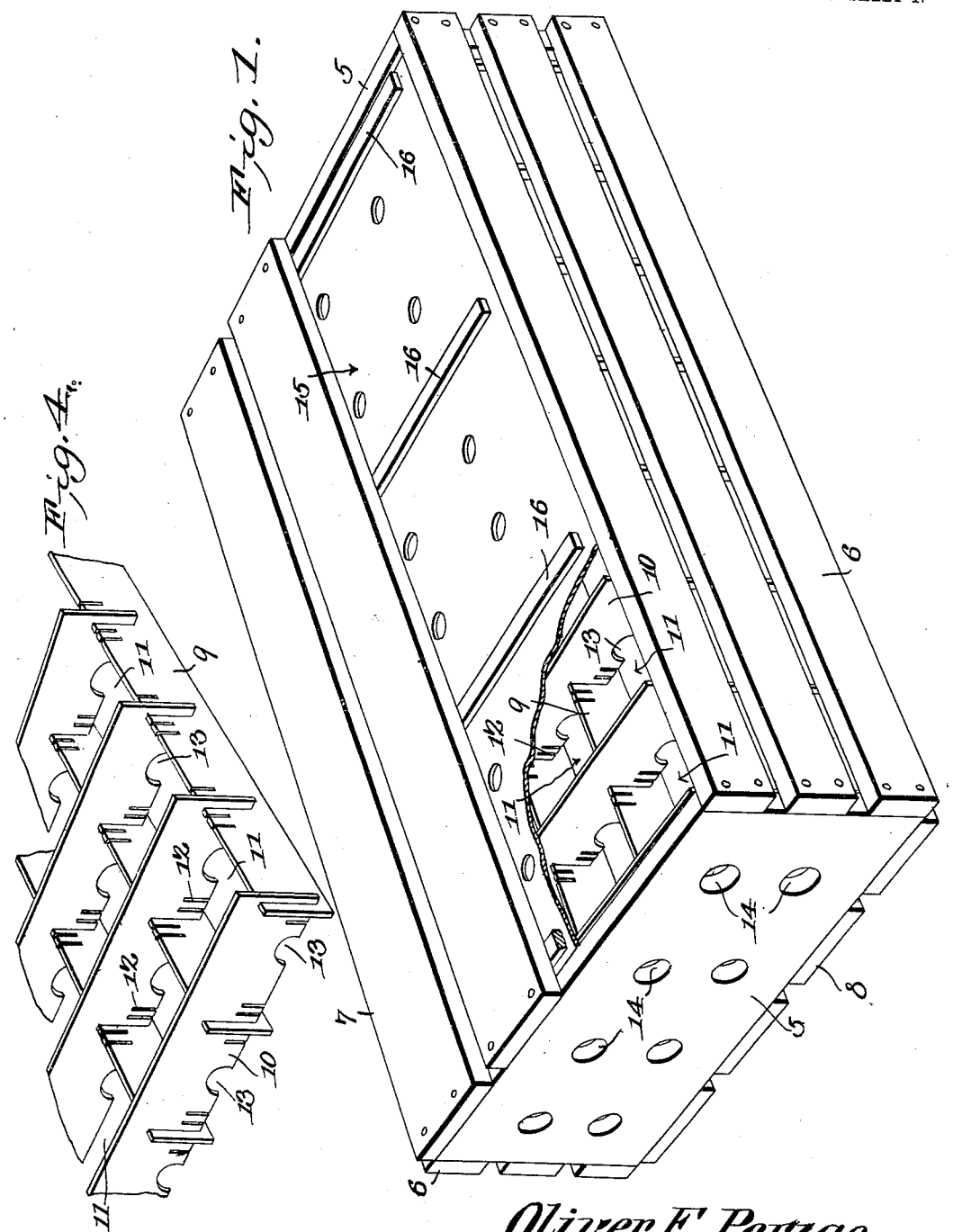

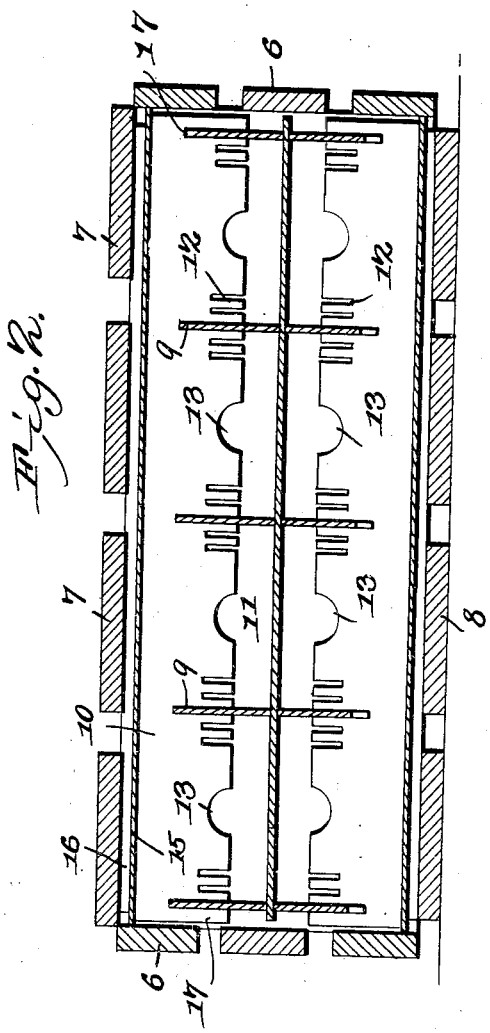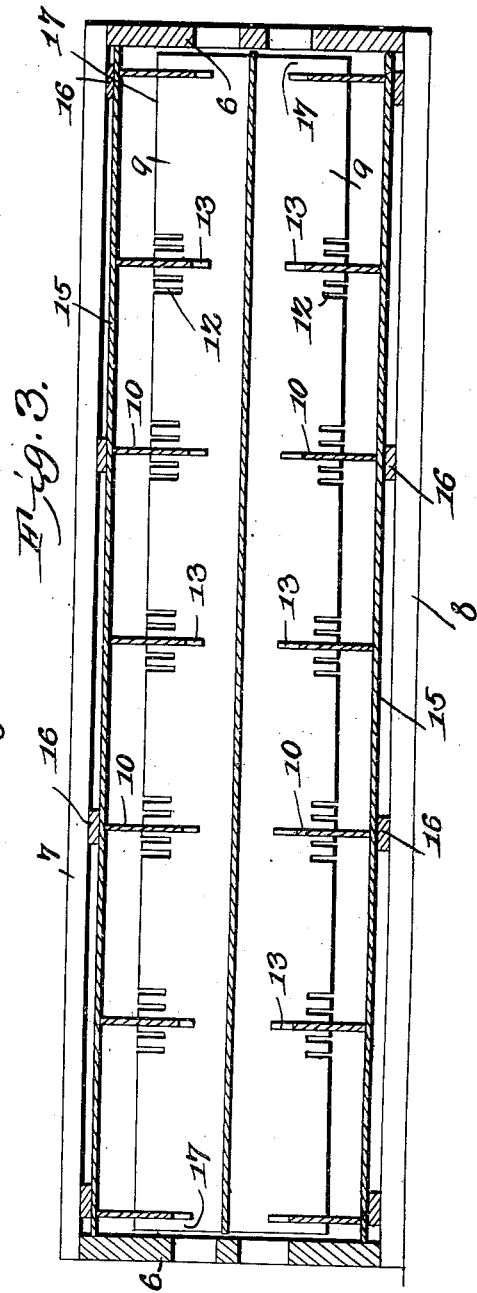

OLIVER ELBRIDGE PERIGO, OF OAKLAND, CALIFORNIA.

VENTILATED FRUIT-CRATE.

No. 883,907.  Specification of Letters Patent.  Patented April 7, 1908.

Application filed March 6, 1906. Serial No. 304,577.

*To all whom it may concern:*

Be it known that I, OLIVER ELBRIDGE PERIGO, a citizen of the United States, residing at Oakland, in the county of Alameda and State of California, have invented a new and useful Ventilated Fruit-Crate, of which the following is a specification.

This invention relates to shipping crates or cases, and more particularly to a ventilated crate especially designed for shipping or transporting fruit, eggs, and other perishable articles.

The object of the invention is to provide a crate having a plurality of cells or compartments adapted to receive and protect the fruit during transportation, said partitions being provided with openings or recesses to permit the free circulation of air, and also to permit the inspections of the contents of the crate.

A further object of the invention is to provide means for adjusting the collapsible partitions forming the fruit containing compartments so as to accommodate large or small fruit.

A still further object is to generally improve this class of devices so as to add to their utility and durability, as well as to reduce the cost of manufacture.

With these and other objects in view, the invention consists in the construction and novel combination and arrangement of parts hereinafter fully described and illustrated in the accompanying drawings, it being understood that various changes in form, proportions and minor details of construction may be resorted to within the scope of the appended claims.

In the accompanying drawings forming a part of this specification: Figure 1 is a perspective view partly in section of a ventilated crate constructed in accordance with my invention. Fig. 2 is a transverse sectional view of the same. Fig. 3 is a longitudinal sectional view. Fig. 4 is a detail perspective view of a portion of one of the fruit containing cells.

Similar numerals of reference indicate corresponding parts in all of the figures of the drawings.

The improved crate is preferably rectangular in shape as shown, and consists of the end walls 5 connected by bars or slats which form the side walls 6 and the top and bottom 7 and 8 of the crate. Arranged within the crate are a plurality of collapsible cells consisting of longitudinal partitions 9 connected by transverse partitions 10 and defining a plurality of fruit receiving compartments 11.

The partitions 9 and 10 are each provided at one longitudinal edge thereof with a series of slits or vertical openings 12 which engage the cuts or slits formed in the adjacent partition when said partitions are assembled and thereby prevent accidental longitudinal, and transverse movement of the same. By having the partitions formed with the slits or openings as shown, said partitions may be adjusted to vary the size of the compartments 11 so as to permit the latter to accommodate fruit of different sizes.

The lower longitudinal edges of the partitions 10 are formed with alined openings 13 which register with suitable apertures 14 formed in the walls 5, so as to permit the free circulation of air within the several fruit containing compartments. The partitions 10 preferably extend a short distance above the adjacent longitudinal edges of the partitions 9 as shown, whereby the air is free to circulate transversely through the several compartments. The collapsible cells are spaced apart by means of perforated division plates 15 preferably reinforced by transverse cleats 16 so as to space said partitions from the adjacent bars or slats 6 and thus allow the air to pass through the openings between the slats and thence through the perforations in the division plates to the several fruit containing compartments.

Attention is called to the fact that by having the apertures formed in the end walls 5 registering with the openings 13, the contents of the crate may be readily inspected, and the air admitted at each end of the crate to the several compartments while by having the partitions 9 spaced from the adjacent longitudinal edges of the partitions 10 as indicated at 17, the air is also permitted to pass transversely across the crate and circulate above the fruit in the different compartments.

From the foregoing description it will be seen that there is provided a simple, inexpensive and efficient crate admirably adapted for the attainments of the ends in view

Having thus described the invention what is claimed is:—

A ventilated crate having perforated end walls, outer perforated division plates disposed within the crate and bearing against the top and bottom walls of the latter, an intermediate division plate, and a plurality of collapsible cells formed of intersecting longitudinal and transverse partitions, some of said partitions being disposed in contact with the intermediate division plate and spaced from the outer plates to form upper and lower transverse air passages, the other partitions being arranged to bear against the outer division plates and having their inner longitudinal edges provided with semicircular openings and spaced from the intermediate division plate to form longitudinal air passages disposed one on each side of the intermediate plate, said openings being disposed in alinement with the perforations in the end walls of the crate and forming a source of communication between the adjacent cells, there being vertical slits formed in the longitudinal edges of the several partitions whereby said partitions may be adjusted laterally to vary the size of the cells.

In testimony that I claim the foregoing as my own, I have hereto affixed my signature in the presence of two witnesses.

OLIVER ELBRIDGE PERIGO.

Witnesses:
WILLIAM S. J. STEPHENS,
THOMAS W. HARGREAVES.